(12) United States Patent
Kumar (10) Patent No.: US 8,583,669 B2
(45) Date of Patent: Nov. 12, 2013

(54) QUERY SUGGESTION FOR EFFICIENT LEGAL E-DISCOVERY

(75) Inventor: Shailesh Kumar, Hyderabad (IN)

(73) Assignee: Google Inc., Mountain View, CA (US)

( * ) Notice: Subject to any disclaimer, the term of this patent is extended or adjusted under 35 U.S.C. 154(b) by 53 days.

(21) Appl. No.: 13/219,869

(22) Filed: Aug. 29, 2011

(65) Prior Publication Data

US 2012/0310966 A1 Dec. 6, 2012

(30) Foreign Application Priority Data

May 30, 2011 (IN) .......................... 1840/CHE/2011

(51) Int. Cl.
*G06F 17/30* (2006.01)
(52) U.S. Cl.
USPC ............................. 707/758; 707/760; 707/767
(58) Field of Classification Search
USPC ........ 707/758, 760, 767, 769, 999.2; 719/317
See application file for complete search history.

(56) References Cited

U.S. PATENT DOCUMENTS

| | | | | |
|---|---|---|---|---|
| 6,169,986 B1 * | 1/2001 | Bowman et al. ....................... | 1/1 |
| 6,886,009 B2 * | 4/2005 | Jeng et al. ............................. | 1/1 |
| 7,287,025 B2 * | 10/2007 | Wen et al. ............................. | 1/1 |
| 8,001,121 B2 * | 8/2011 | Wang et al. ..................... | 707/736 |
| 8,090,705 B1 * | 1/2012 | Panse ............................. | 707/708 |
| 2003/0050923 A1 * | 3/2003 | Chang et al. ....................... | 707/3 |
| 2007/0043774 A1 * | 2/2007 | Davis et al. .................... | 707/200 |
| 2008/0010605 A1 * | 1/2008 | Frank ............................. | 715/765 |
| 2008/0250013 A1 * | 10/2008 | Gruskin et al. .................... | 707/5 |
| 2009/0150906 A1 * | 6/2009 | Schmidt et al. ................ | 719/317 |
| 2010/0082649 A1 * | 4/2010 | Gutt et al. ....................... | 707/758 |
| 2011/0258212 A1 * | 10/2011 | Lu et al. ......................... | 707/760 |
| 2012/0005225 A1 * | 1/2012 | Chidlovskii .................. | 707/769 |

* cited by examiner

*Primary Examiner* — Kimberly Wilson
*Assistant Examiner* — Noosha Arjomandi
(74) *Attorney, Agent, or Firm* — Sterne, Kessler, Goldstein & Fox P.L.L.C.

(57) ABSTRACT

Given a set of training documents relevant to a litigation hold, properties common to the documents relevant to the case and not common or missing in the non-relevant documents can be identified and used to generate a litigation hold query to be suggested to a user. After receiving a training set of documents, one or more common properties between the relevant training documents are identified. Based on the common properties, a suggested litigation hold query can be generated to return documents in a larger set that are representative of the relevant documents in the training set. Additionally, a query can be generated by iteratively improving a base query to return documents sharing characteristics of a training set of documents. Suggested queries may evolve as the training set evolves.

19 Claims, 8 Drawing Sheets

QUERY SUGGESTION FOR EFFICIENT LEGAL E-DISCOVERY

CROSS-REFERENCE TO RELATED APPLICATIONS

This application claims priority to Indian Provisional Application No. 1840/CHE/2011, filed May 30, 2011, which is incorporated by reference herein in its entirety.

BACKGROUND

1. Field

Embodiments relate to electronic discovery of documents subject to a litigation hold, and particularly to efficiently identifying a set of documents relevant to a litigation.

2. Related Art

During or in anticipation of a litigation, parties to a litigation may be required to preserve and eventually produce documents in their possession that relate to the litigation. Documents to be preserved are known as being subject to a litigation hold. Documents may exist in electronic form in computer systems or electronic storage devices. One element of electronic discovery (e-discovery) involves obtaining a thorough set of relevant documents from those computer systems and electronic storage devices. When there are a large number of documents contained in one or more computer systems, the e-discovery process can be very cumbersome. Compliance with a litigation hold requires a thorough search of the computer systems and electronic storage devices. However, at least for reasons of privacy and confidentiality, parties want to avoid producing documents that are not relevant to the litigation. Therefore, a final determination of a document's relevance to the litigation is usually made by a manual review process. The expense of this process is related to the number of documents reviewed.

To reduce the expense of e-discovery, computer software may be used to automatically search for and retrieve relevant documents. Typically, the software will search for emails or documents containing selected keywords or names of individuals related to the litigation. The names and keywords used in the search are identified by the parties or people associated with the case. However, the results of such searches may include many documents that are not relevant to the litigation or may exclude many documents that are relevant to the litigation.

BRIEF SUMMARY

Embodiments relate to systems and methods for suggesting queries to be used to identify documents for a litigation hold. In an embodiment, a training set of documents is received. Each document in the training set has a relevance indicator associated with it. Properties shared between documents having a similar relevance indicator are identified. Based on the identified properties, a litigation hold query is generated that returns documents with the identified properties.

In an embodiment, a training set of documents is received, where each document in the training set has a relevance indicator associated with it. One or more keywords is received, and the training set of documents is queried based on the received keyword or keywords. Neighboring queries are built from the received keyword or keywords, and are evaluated to determine the quality of each neighboring query. The best neighboring query is selected based on the quality score of the query and presented to a user.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Overview

Embodiments relate to systems and methods for performing electronic discovery of documents subject to a litigation hold, and particularly to efficiently identifying a set of relevant documents. A document may be any type of electronic file, including but not limited to an email, text message, distribution list, spreadsheet, text file, bit map, or graphics file. One of ordinary skill would recognize that other types of electronic files may also be electronic documents according to embodiments. Electronic documents, as referred to herein, may be accessible by known electronic communications methods and may be stored in a variety of storage media, including but not limited to electronic media, such as Random Access Memory (RAM) or Read Only Memory (ROM), magnetic media, such as tape drives, floppy disks or hard disk drives (HDD), and optical media, such as Compact Disks (CD) or Digital Video Disks (DVD).

To define the parameters and criteria of a litigation hold, a legal team may consider the facts of the case and the parties involved in the events leading up to the case. Based on the locations of these documents, a target corpus of documents to search may be identified. In some cases, it may be necessary to search through a large number of documents in a large storage area to find a few documents containing relevant information. The storage area to be searched may be identified by physical storage devices, logical storage partitions, document security designations, or by any other means known to one of ordinary skill in the art. A large search scope increases the potential for finding relevant documents but may require a prohibitively large search time and expense. The entire corpus of documents may be searched for documents that are relevant to the litigation, and a manual review of every document in the corpus could be a long and laborious process. Effectively filtering or culling the corpus may reduce the quantity of documents that need to be reviewed. Documents not meeting the search criteria may not be reviewed. In embodiments, the corpus of documents may be contained within a single computer or storage device, or the corpus of documents may be spread across multiple servers, client computers, storage devices and other components that may or may not be interconnected. For example, the corpus of documents may be stored in a hosted user environment utilizing distributed storage.

Figure 1:
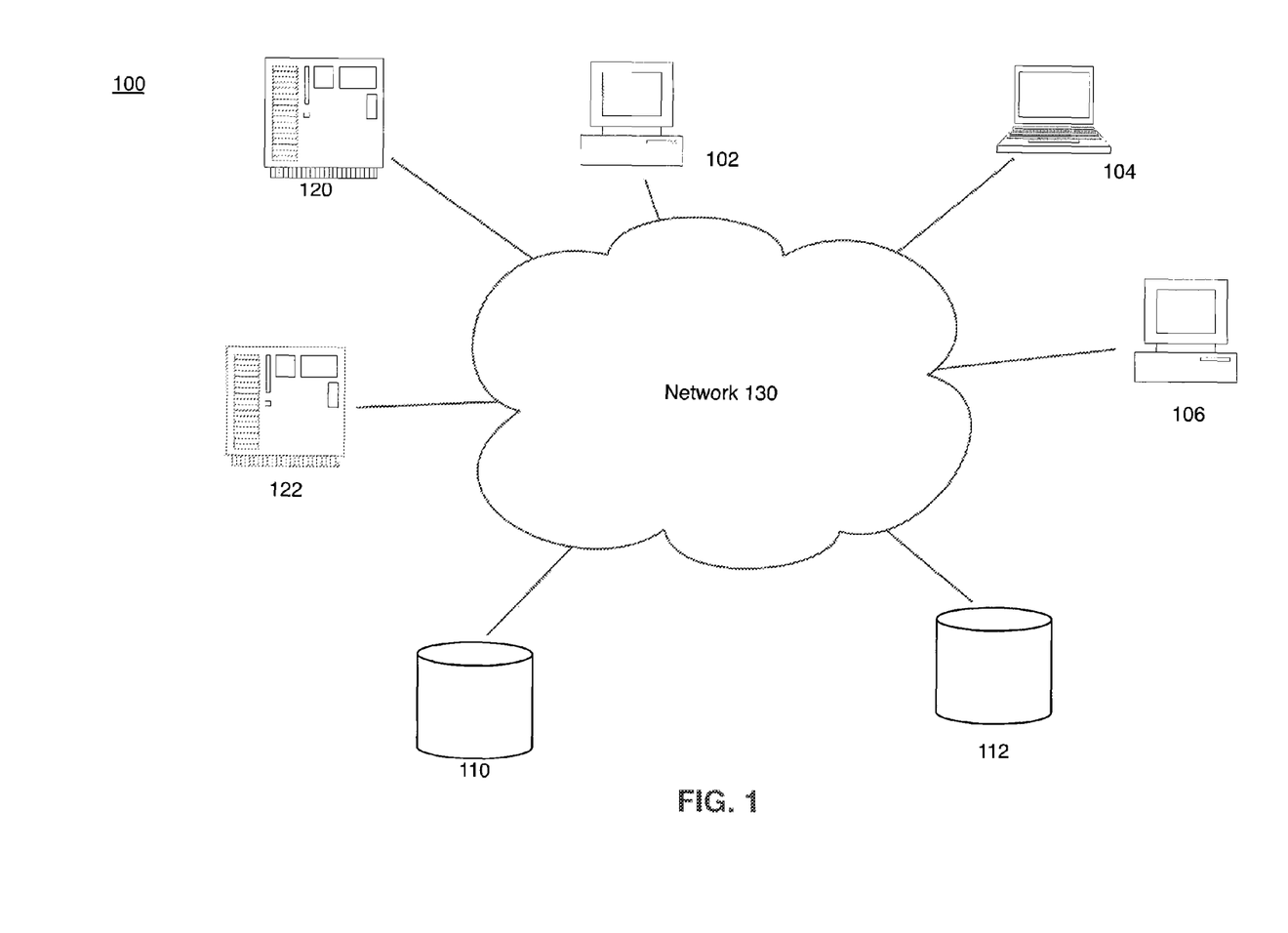
FIG. 1 is a diagram of an exemplary system that may be used in embodiments described herein.

FIG. 1 is a diagram of a system 100 in which a corpus of documents may be contained, according to an embodiment. Although system 100 is described herein with respect to a limited number of devices and a single network, one of ordinary skill in the art will recognize that a system containing relevant documents may include different numbers of components and other types of components than those shown. In addition, the system components may be stand-alone or may be interconnected by one or more networks of various types.

System 100 of FIG. 1 is provided as a non-limiting example for explanation purposes. System 100 includes processing devices, such as servers 120 and 122, and client computers 102, 104 and 106. System 100 also includes storage devices 110 and 112. The devices in system 100 are interconnected by network 130. Network 130 may be a local area network (LAN), wide area network (WAN), intranet, internet, WI-FI, cell phone network, or any other wired or wireless network for communication between computing devices. One of ordinary skill in the art would recognize that there are many possible variations on the number and interconnection of computing and storage devices in which all or part of the corpus of documents could be contained and searched according to embodiments.

Utilizing one or more computing devices, the corpus of documents may be searched for potentially relevant documents. In system 100, a search may be initiated, for example, at client computer 102. The corpus of documents may be isolated to documents stored within client computer 102. Additionally, or alternatively, the corpus may include documents contained within, e.g., storage device 110 and/or server 120. When a search is performed, information about each document or set of documents in the corpus of documents may be obtained. This information is compared to a set of search criteria that has been prepared in response to the litigation hold. The search criteria may include several types of information used to identify potentially relevant documents. For example, the names and locations of documents satisfying the search criteria may be returned in the search results. The actual documents may also be returned, or links may be provided to individual documents. Other sets of search results are possible.

Each potentially relevant document may be ranked according to how well it meets the search criteria. This ranking data may be performed by the search software and returned with the set of documents. Ranking data may be used to return a limited number of "top ranked" documents that best match the search criteria based on the ranking information. For example, if search criteria includes a particular keyword, documents may be ranked according to how many times each document contains the particular keyword.

Depending on the criteria provided for the search, the set of documents returned from a search may range from being empty to being very large. The quality of the search may be determined by how many relevant documents are identified in the returned set of documents, and may also consider how many non-relevant documents are identified. A higher quality search identifies more relevant documents and fewer non-relevant documents in the set of documents.

In order to determine the quality of a search, documents identified in the search may be retrieved and reviewed to determine whether they are relevant to the litigation hold. The review may be done by one or more members of the legal team associated with the litigation or by other means. Once a document is reviewed, the document may be labeled with an indication of relevance. The label may provide a binary indicator, indicating that a document is either relevant or non-relevant. Alternatively, the label may indicate a degree of relevance to the litigation hold, such as a percentage.

Once all the documents, or a defined subset of documents, in the set of returned documents have been labeled with a relevance indicator, the quality of the search can be determined. Unless it can be shown that all the relevant documents have already been retrieved, the initial search criteria, the quality of the results, and the returned set of documents may be reviewed. New search criteria may then be generated and a new search may be performed. Several iterations of search and review may be required to develop criteria that will result in a high quality search.

As described herein, a training set of documents may be utilized to help generate keywords and queries. A training set of documents may be a subset of a large set of documents subject to a litigation hold. For example, if 100,000 documents exist in a set under litigation hold, a set of 1,000 may be used as a training set. The training set of documents may be determined by a systematic workflow that samples documents based on multiple criteria, such as the top documents relevant to a particular query, the top documents representative of a cluster, a random sample of documents across all documents or within a cluster, or any other set of documents. The training set may be reviewed by a member of a legal team to determine what portion of the which of the training set documents are relevant to the case and which are not. After reviewing the training set of documents, embodiments described herein may use the data of the training set to suggest keywords, and queries to return documents in the larger set that reflect the characteristics of the documents previously reviewed. These documents may also be reviewed or labeled in the same way as the training documents.

The training set of documents may constantly evolve, and suggestions may improve based on the documents in the training set. For example, embodiments may start with a training set of 100 documents with labels indicating whether individual documents are relevant or not. Each subsequent iteration may add another 100 documents to the labeled set.

These additional documents may be added to the training set to improve keyword or query suggestions.

In conjunction with labeled documents, a set of predicted labeled documents may also be used to suggest keywords and queries. These documents may be generated in part by building a classifier. A classifier may be built using the currently labeled set of documents. For example, 500 out of 100,000 documents may be currently labeled. The relevance score over the remaining unlabeled set of documents (in this example, 99,500 documents) may be predicted using the classifier. The relevance score may range, for example, between −1 and 1. In this example, score of −1 indicates that the document is predicted to be highly irrelevant, while a score of 1 indicates that the document is predicted to be highly relevant. The absolute value of the prediction score may indicate how confident the model is in making the prediction. For example, if the score is close to 0 (i.e. 0.1 or −0.075) the classifier is deemed not confident as to whether to label the particular document as relevant or non-relevant. If the score is close to 1 (i.e. 0.85 or −0.93), the classifier has a high confidence in its prediction of relevant and non-relevant documents. Of the unlabeled documents, those documents having a high confidence score may be labeled to be either relevant or not. The confidence score may be compared against a threshold to determine whether the document should be labeled. For example, out of 99,500 unlabeled documents, 25,000 documents may have a confidence score above a threshold (for example, 0.6). Those 25,000 documents may be assigned a predicted label based on the sign of the score (positive for relevant, negative for non-relevant). The total pool of 500 labeled documents and 25,000 predicted labeled documents may be used to suggest keywords and queries.

Search Criteria

Search criteria may include several types of information about the relevant documents. For example, the litigation hold may target documents that were created, modified, or transmitted during one or more specific time periods. In this example, if the time and date information obtained for a particular document does not fall within a specified period, the document would not satisfy the search criteria and would not be included in the results. For a variety of reasons, specified time periods may be modified in subsequent searches. A document falling within the specified time period(s) may be subject to further analysis as described herein.

Another common element of search criteria is the identification of document owners or custodians. For example, emails and other electronic documents belonging to individuals that are involved in the events leading up to the litigation may be relevant to the litigation hold and may be identified as potentially relevant to the search. As new information is obtained about the individuals involved in the related events, a new list of custodians can be generated for an update to the search criteria.

Other search criteria may be used as well. For example, the name or textual content of a document may be compared to a list of keywords that are related to the subject matter of the case. If a keyword is found in the title or contents of the document, the document may be identified as potentially relevant to the litigation. Keywords used as search criteria may not be limited to single words. A keyword may be a string of characters or may include operators, such as wildcard characters that are used in searching character strings, as known to persons of ordinary skill in the relevant art(s). A keyword may also be known as a search term, and may include two or more words. In this way, keywords can be used to find, for example, words, pairs of words, strings of words, phrases, or expressions. Some keywords may be more significant than others in a given search. While some keywords may be only an indication of possible relevance, other keywords may, by themselves, positively identify a document as relevant or non-relevant without the need for further review.

Search criteria may be further defined by using complex queries, such as those used in character string manipulation. Conjunctive and disjunctive boolean operators (AND and OR) may be used together to generate queries having complex expressions of keywords. Similarly, the NOT operator can be used to generate queries that provide greater specificity, as will be explained below.

The above-described search elements may be combined together to develop a complete set of search criteria that is used to search the identified corpus of documents for potentially relevant documents. The search may be performed by one or more processing devices.

Figure 2:
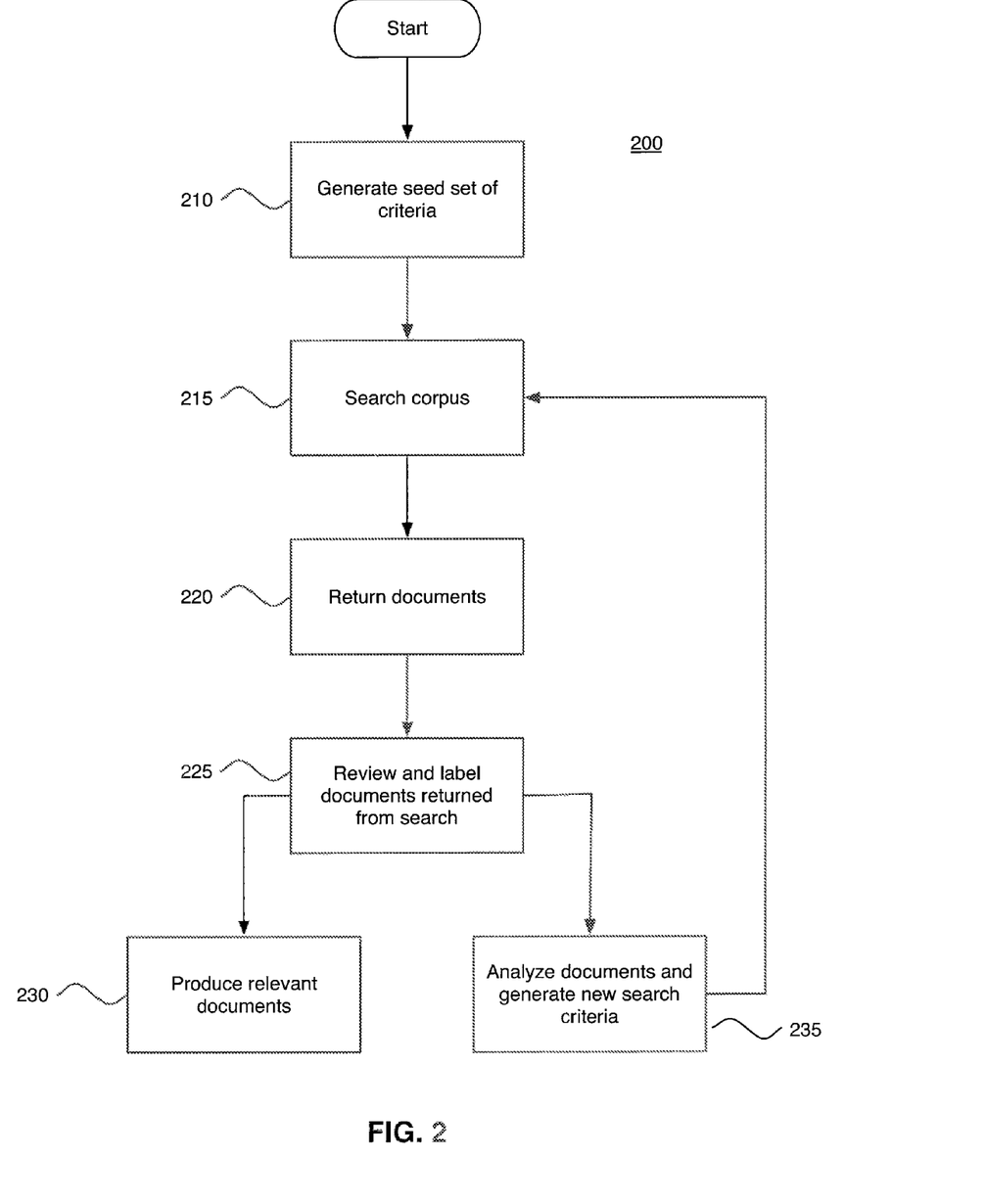
FIG. 2 is a flow diagram of a method for searching for potentially relevant documents, according to an embodiment.

FIG. 2 is a flow diagram of an exemplary method 200 detailing the process described above, according to an embodiment. At block 210, information pertaining to the litigation is examined and an initial set (seed set) of criteria is generated. The seed set may be based on, for example, educated guesses by those knowledgeable in the particular litigation. Initial criteria may include, for example and without limitation, identification of a corpus of documents to search, target time periods, a seed set of custodians, and a seed set of keywords. At block 215, the corpus of documents is searched using the search criteria. At block 220, a set of potentially relevant documents is returned.

At block 225, the documents are reviewed. During this process, the set of potentially relevant documents is reviewed for relevance to the litigation hold, and reviewed documents are labeled with an indication of relevance. Documents that are labeled as relevant at block 225 may be produced, at block 230, for use in the litigation. Also, at block 225, some relevant documents may be removed from the production due to confidentiality, privilege, and other considerations.

Following block 225, the search criteria, the resulting set of documents, and the documents' respective indications of relevance may be analyzed to determine the quality of the search at block 235. If another search is desired, a new set of search criteria may be generated at block 235. Using the new search criteria, the process returns to block 215, at which a subsequent search is performed and a new set of potentially relevant documents is returned. The process then proceeds to block 220, as described above and iterates through blocks 215, 220, 225 and 235 in an effort to improve the quality of the search results.

Improving the quality of the search in a subsequent iteration requires a thorough analysis of the potentially relevant documents and the indications of relevance from a prior search. A challenge for a legal team is to perform the analysis and generate improved search criteria in as little time as possible. Many reviewers may be needed to manually review all the potentially relevant documents in a reasonable amount of time. This process is frequently expensive and time consuming.

According to an embodiment, new search criteria for a search in a litigation hold can be quickly generated by an automated method. A first set of documents may be returned from an initial search based on a seed set of keywords or queries. In an embodiment, a process and system are provided for generating additional keywords or queries to be used in the search criteria. One or more processing devices may be used to generate keywords or queries based on the results of an initial search. Various analytical techniques may be employed to determine the significance of keywords found in the documents or queries returning relevant documents.

Generating Keywords

As discussed above, a search for documents relevant to litigation may begin with a simple search using one or more keywords (a seed set) that are identified as being related to the subject matter of the litigation. However, relying on the set of documents resulting from a simple search may not be sufficient in certain circumstances. An initial search may be so broad that the resulting set of documents is prohibitively large. Alternatively, the search may be so narrow that it fails to include many relevant documents. Further, the initial set of keywords may not be the best keywords or the keywords most indicative of relevance to the litigation. There may be other keywords relevant to the litigation that were not included in the seed set.

As described above, an iterative process of searching with a set of keywords, evaluating the results returned by that set of keywords, and updating the set of keywords may be used to improve the quality of a search. In order to improve the quality of the searches with each iteration, it is important to determine which elements of the search criteria were most effective. For example, keywords which yield the most relevant documents and the fewest non-relevant documents have a higher "discriminatory power" than keywords yielding more non-relevant documents, fewer relevant documents, or both. In addition, if the relevance indications indicate degrees of relevance rather than simply relevance vs. non-relevance, the discriminatory power may be determined by yielding the documents with the highest degree of relevance.

The discriminatory power of a keyword may be determined either directly or indirectly. In both cases, labeled documents are needed, where each label indicates whether a document is relevant to the case. As detailed above, the labeled documents may be either the actually labeled documents or predicted labeled documents. The discriminatory power of a keyword may be computed directly, for example, as the mutual information of a keyword with respect to the relevance indications. Other criteria similar to mutual information may be used to directly determine the discriminatory power of a keyword.

Alternatively, indirect computation of a keyword's discriminatory power may be done in two steps. In the first step, a classifier such as a linear support vector machine (SVM) classifier may be built using labeled training data. Such a classifier may learn a weight for each keyword in the set of documents. These weights may indicate the discriminatory power of each keyword.

Other methods may be used to identify keywords that may be useful to return further relevant documents in the set of documents under litigation hold. In a set of relevant documents found by a search using a seed set of keywords, one or more of the keywords from that seed set will be present in every document. Keywords from the seed set of keywords may be referred to herein as seed set keywords. Keywords not in the seed set but that exhibit certain characteristics when compared to keywords from the seed set may be referred to herein as relationship based keywords. Such relationship based keywords may be useful in the review process. Relationship based keywords may be determined based on a co-occurrence relationship or a similarity relationship.

For example, a second keyword's co-occurrence context with a seed set keyword may indicate that the second keyword is useful. The co-occurrence context of a second keyword refers to the nature of the spatial proximity of the second keyword as compared to the seed set keyword as measured across the entire corpus. For example, a second keyword may occur within a window of 5 words before or after a seed set keyword, may occur in the same paragraph as a seed set keyword, or may occur in the same document as a seed set keyword. These may be referred to as the window context, paragraph context, and document context, respectively.

In an embodiment, a second set of keywords may be based on the consistency relationship generated from a seed set keyword. For example, once the context definition is determined, the frequency of occurrence of the seed set keyword with all other keywords in that context may be computed across the entire corpus. This measure may be known as the joint co-occurrence between the seed set keyword and another keyword. Using a normalization technique, such as point-wise mutual information, Jaccard coefficient, cosine similarity, or other normalization techniques, the joint co-occurrence frequency may be converted to a consistency measure which quantifies how much more often two keywords co-occur in the predefined context than by random chance. If a keyword occurs with a high consistency with a seed set keyword, then it likely shares the discrimination properties with the seed set keyword and may be suggested as an alternate keyword.

In an embodiment, a second set of keywords based on a similarity relationship may be generated from words related to the seed set of keywords. There are many ways in which a keyword's similarity with other keywords may be generated. For example, a similar set of keywords may be generated based on a second order co-occurrence consistency measure. Second order co-occurrence consistency measures may indicate that two keywords are similar if they co-occur consistently with the same set of keywords. Keywords having a meaning similar to seed set keywords may be synonymic words or phrases from a known knowledge base such as WordNet, a thesaurus, a dictionary, or other sources. Keywords of a similar meaning can also be abbreviations, slang terms, incorrect spellings of keywords or words of a different language. Further, keywords may be known to be synonymous or similar based on knowledge from a particular corpus of documents. For example, certain brand names used by a particular business may be known to be synonymous with generic terms based on the documents used by that particular business. Additionally, a public corpus of documents may be used to determine similar or synonymous words.

Another example of generating new keywords using linguistic analysis is identifying keywords of a similar type or category. New keywords may be generated from words of the same type or category as seed set keywords. A hyponym is a word that may be considered as a type of another word, known as a hypernym. For example, the word "green" is a hyponym of the word "color." In this example, the word "color" is the hypernym. Other hyponyms of "color" are other colors, such as blue, red or yellow. If "green" is in the seed set of keywords, other colors not listed in the seed set may also be useful keywords. Thus, in an embodiment, a new list of keywords may be generated from other hyponyms of the hypernym of one or more keywords in the seed set of keywords.

Relationship based keywords may be identified with the assistance of data mining techniques implemented on a corpus of documents. For example, data mining techniques may be used on an enterprise's collection of documents to determine that a particular product name and an acronym share the same meaning. Additionally, data mining techniques may be used to determine that two words appear together and share a co-occurrence relationship.

Combinations of the above described keyword generation methods may be used for determining a new set of search keywords. For example, a keyword with a high discriminatory power may be identified using a training set of documents. Using this keyword, other keywords having a relationship with that identified keyword may be included in the new set of search keywords.

For example, a particular keyword X may have a high discriminatory power. Additionally, keyword Y may be identified which has a low discriminatory power, but has a high co-occurrence with keyword X. Suggesting keywords using discriminatory power alone may result in Y not being part of the suggested set of keywords. Additionally, the relationship between keyword X and keyword Y would only have been evident if keyword X was identified as having high discriminatory power. Thus, by combining the two methods above, keyword Y may be suggested to a user. The fact that the keyword Y was not found to be discriminatory could be attributed to the possibility that the label data (both actual and predicted) may still be incomplete. Suggestion methods as disclosed herein may utilize this partial knowledge to create a more complete knowledge through signals embedded in the corpus, such as the various kinds of relationships between keywords.

Such a combination of the two above-described techniques may be implemented using, for example, a random walk. In a random walk based on probabilities, the first probability may be directly related to the discriminatory power of the keyword. Thus, the second probability may be based on the relationship probability to the discriminatory keyword. Keywords that are generated as a result of the random walk may be suggested to the user.

Figure 3:
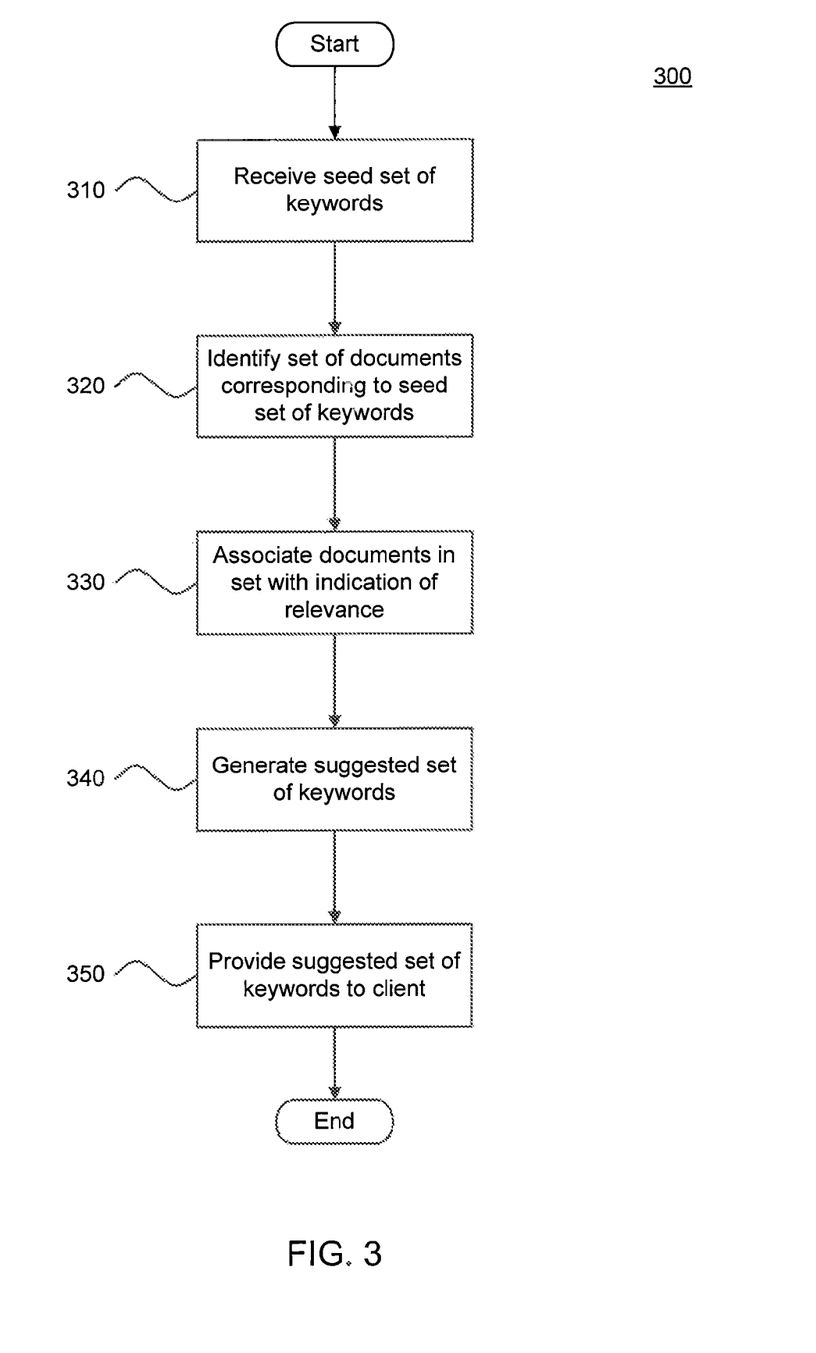
FIG. 3 is a flow diagram of a method of a process for generating new keywords in accordance with an embodiment.

FIG. 3 is a flow diagram of a method 300 of a process for providing a suggested set of keywords, according to an embodiment.

At block 310, a seed set of keywords is received. The seed set may be provided by, for example, a client such as a member of a legal team, based on information pertinent to the current matter.

At block 320, a set of documents corresponding to the seed set is identified. Documents may be identified by searching a specific corpus of documents on a particular device, such as a computer, storage device, or on a hosted user environment.

At block 330, documents in the set identified at block 320 are associated with an indication of relevance. For example, a particular document may be very related to the particular matter, and may receive an indication noting that the document is relevant. As described above, an indication of relevance may be provided as a numerical score. For example, a particular document may receive a score of 95 on a scale of 0-100, indicating that the document is very relevant to the particular matter. Alternatively, documents may simply be given a binary indication of "relevant" or "not relevant".

At block 340, a suggested set of keywords is generated. The suggested set of keywords may be generated by a processing device, such as a computer executing software. The suggested set of keywords may be determined to be discriminatory according to the discriminatory power of the particular keyword. Additionally, the suggested set of keywords may share a relationship with one or more of the first set of keywords. Additionally, each keyword in the suggested set may or may not be a keyword present in the seed set of keywords.

At block 350, the suggested set of keywords is provided to a client.

In an embodiment, a random walk may be utilized to suggest keywords based on both the discriminatory power and relationship between keywords. Thus, at block 340 of method 300, a second set of keywords may be generated that are determined to be discriminatory according to the discriminatory power of the particular keyword. Based on this set of keywords, a suggested set of keywords may be generated based on the relationship between other words and keywords in the second set. The suggested set of keywords may also include keywords related to seed set keywords. For example, a keyword with a high discriminatory power in the second set may be the word "phone". Thus, keywords and terms related to the word "phone", such as "telephone", "cell phone", or "smartphone" may be provided in the suggested set of keywords, based on a random walk.

In an embodiment, generated sets of keywords are based on the documents in the set identified at block 320. A subset of the returned documents may be considered as a training set of documents. As described with respect to block 330, documents in the training set may be associated with an indication of relevance. Using the indications of relevance, words more likely to appear in documents having a high associated relevance score may be identified and suggested to a client in accordance with blocks 340 and 350. Additionally, words more likely to appear in documents having a high associated relevance score may be utilized to find additional keywords using a random walk algorithm. Words more likely to appear in documents having a low associated relevance score may also be identified and suggested to a client as words to be ignored in further searches. The training set of documents used may grow in accordance with embodiments described herein to improve the keyword suggestions.

In an embodiment, a current set of documents corresponds to keywords in the both the seed set and keywords in the generated suggested set. Thus, the suggested set of keywords may be used to identify further relevant documents in the searched corpus. Alternatively, in an embodiment, a current set of documents may not correspond to keywords in both the seed set and keywords in the generated suggested set. This may be, for example, if the keywords in the generated suggested set are indicative of non-responsive or irrelevant documents.

New search keywords may be identified using the seed set of keywords, a set of documents corresponding to the seed set of keywords, and indications of relevance of the set of documents. The keywords found in a set of relevant documents may be useful in separating relevant from non-relevant subject matter. In an embodiment, a new set of keywords may be generated from keywords that are present in the relevant set of documents, but not present in the non-relevant documents. Thus, a set of keywords may be generated based on these characteristics. By excluding keywords from the seed set in the generated set of keywords, the keywords suggested to the client are entirely new to the client.

The keyword suggestion process in accordance with embodiments may be continuously evolving in an iterative fashion. For example, a set of keywords may be generated and suggested as a result of an iteration of method 300 of FIG. 3. Based on this set of keywords, a further set of keywords may be suggested as a result of a further iteration of method 300 of FIG. 3.

Additionally, as a training set of documents grows, method 300 of FIG. 3 may be repeated with a larger training set of documents. As more documents are added, further discriminatory keywords and relationship based keywords may be identified and suggested to a client.

Generating Queries

Figure 4:
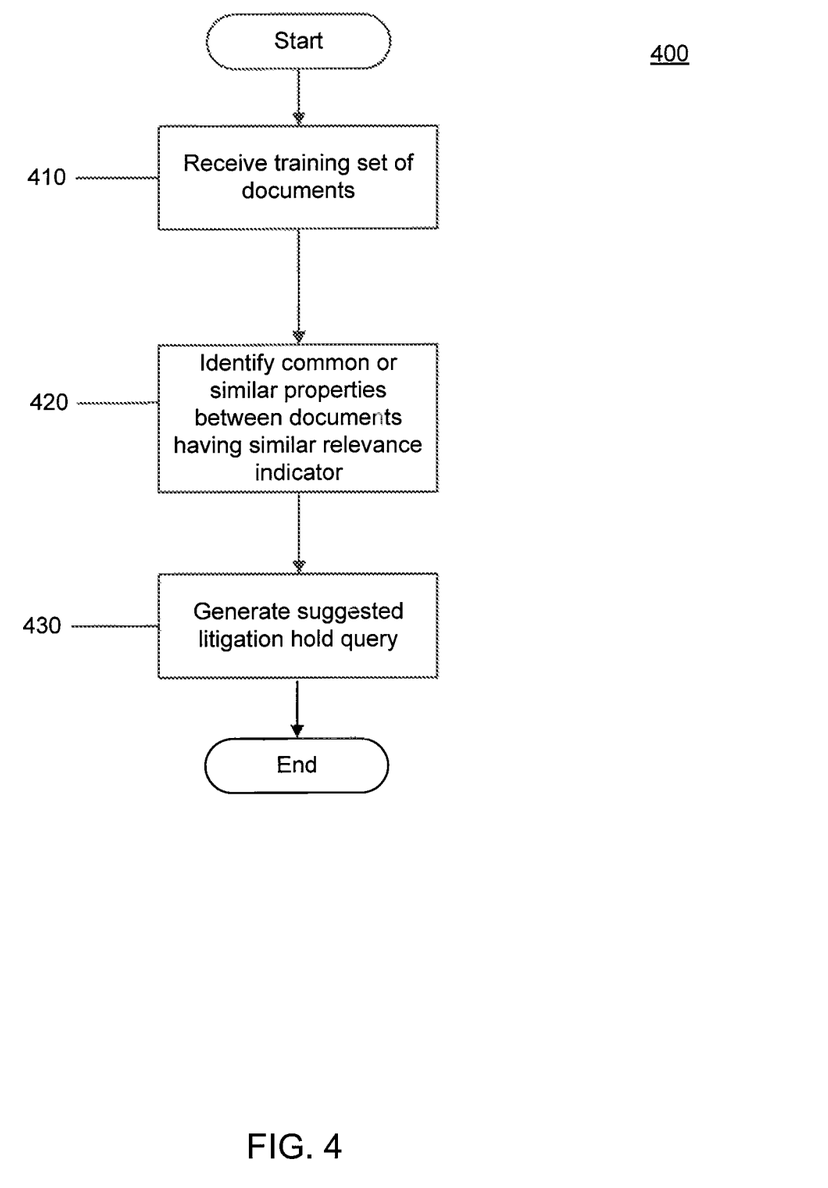
FIG. 4 is a flow diagram of a method of creating a query in accordance with an embodiment.

While knowing the right keywords may be very useful to a legal team, effective queries may provide a more accurate and effective search strategy to identify documents to be either placed on litigation hold or documents that are relevant to a case. In an embodiment, based on a training set of documents, a query used to retrieve documents that share characteristics with documents in the training set may be suggested to a user. FIG. 4 is a flow diagram of a method 400 for suggesting a query to a user, according to an embodiment.

At block 410, a training set of documents is received. Each document in the training set of documents has a relevance indicator. The training set of documents may be a particular number of documents that a legal team believes is representative of the types of documents in the case at hand. Further, the relevance indicator may indicate a degree of relevance or simply a binary notation of relevance or non-relevance. Additionally, a relevance indicator may be associated with all documents using a classifier, as described herein.

At block 420, various common or similar properties shared between documents having a similar or the same relevance indicator are identified. Such properties may be, for example, a common custodian, a common keyword that frequently appears, or a combination thereof. These properties may be identified by a processing device, such as a computer executing software.

Based on the common properties identified at block 420, at block 430, a suggested litigation hold query may be generated by a processing device. The suggested litigation hold query created may return documents that share common properties with particular documents in the training set of documents, such as documents with a particular relevance indicator. The generated query may then be used as is, or with some modifications, by a legal team to retrieve additional documents that are likely similar to the relevant documents provided as part of the training set.

In an embodiment, the relevance indicator is associated with each document prior to each document being received by the processing device. In an embodiment, the relevance indicator may be associated with each document as a result of a separate query, or a relevance/non-relevance classifier built from a previous set of labeled data.

In an embodiment, only similar properties shared between documents identified as relevant and not present in non-relevant documents are identified at block 420. For example, properties present in documents having a binary indication of relevance may be identified at block 420. These identified properties may not be present in documents having a binary indication of non-relevance. Similarly, if the relevance indicator associated with each document in the training set is a relevance score, properties present in documents having a high relevance score may be identified at block 420, provided these properties are not present in documents with a low relevance score. By only including properties shared between relevant documents, false positives may be reduced or eliminated.

The information used to establish a first search criteria may be limited to a seed set of keywords based on case information. A simple keyword based search may search an entire corpus of documents for all the documents that contain one or more of the keywords. In such a search, the keywords are individually compared to the contents of each document. A search result for a particular document will be positive if one or more of the keywords are found in the searched fields of the document. In this type of search, the keywords are compared disjunctively. For example, in a search containing keywords "hat," "bat," and "cat," the result will be positive if any one or more of "hat" OR "bat" OR "cat" is found.

More complex search criteria can be used to execute a search having more precise requirements. A variety of operators and parameters may be used in any number of combinations to increase the precision of the search criteria. New search criteria may be generated based on a training set of documents, indications of relevance for each of the documents, and identifying properties shared between the documents having similar indications of relevance. The shared properties may be keywords or relationships between keywords found in each of the similarly relevant documents.

In an embodiment, an improvement on a simple disjunctive search is to use weighted keywords. As described above, it is possible to identify the discriminatory power of a particular keyword. Using higher discriminatory power keywords in a search is likely to result in documents that are more relevant. Thus, the relevance of a document found can be determined by the power of the keyword used to find it. By designating the discriminatory power or "weight" of a keyword, a weighted list of search results can be produced. This may be valuable when a searcher wishes to obtain a set of the most relevant documents from a search.

In an embodiment, when searching for a single word keyword in the text of a document, a keyword search tool will individually compare the search keywords to single words separated from other words by spaces or punctuation. Therefore, a keyword used in the search criteria for this embodiment is a full word and will only "match" a full word. For example, a search for "cat" will not match the word "catalog" in a document. However, sometimes it is necessary to find any words that contain a common root word or character string. To make it possible to search for part of a word, a search tool may allow the use of one or more wildcards to represent one or more characters. Returning to the above example and using "*" to represent a wildcard, the search term "cat*" would match any word beginning with "cat", such as "cat," "catalog," "catch," or "categorization." The use of wildcards is well known to those skilled in the art.

When a particular word is only of interest in a document when found in the presence of another word in the same document, the AND operator can be used to perform the search. For example, when searching for documents containing both the words "cat" and "hat", a query including "cat AND hat" will provide the desired results. The conjunctive term "cat AND hat" can be used as a term in a disjunctive list with other search terms to create a more complex query, such as "(cat AND hat) OR bat OR rat." The above expression, using the AND and OR operators, is recognized as a boolean expression using boolean operators that are well known to persons skilled in the relevant art(s). In the boolean expression above, the parentheses may be unnecessary as there is an inherent hierarchy among boolean operators. In this case, the inclusion of the parentheses only improves readability. When multiple levels of hierarchy are desired, multiple levels of parentheses may be used to designate the hierarchy. The hierarchy of operations designated by the parentheses may supersede the default order of operations.

Another useful boolean operator is the NOT operator. This operator may be used to exclude files containing particular keywords. Some keywords have a high discriminatory power for identifying non-relevant documents. Any document that contains a keyword that strongly indicates non-relevance may be eliminated from search results by using a combination of the AND and NOT operator. For example, the query "(hat or bat) AND (NOT cat)", would return all documents that contained "hat" or "bat" unless they also contained the word "cat."

Complex queries can be developed using the above described boolean operators. In addition, other techniques for searching strings of text may also be used. For example, it may be of value to find two words only if they are in close proximity to each other. The technology for string searches is extensive and will not be discussed further here, but it should be understood to one of ordinary skill that those techniques are applicable to embodiments.

The set of boolean and string operations available allow the creation of complex queries having multiple complex terms. Just as the discriminatory power of individual keywords may be determined by the quality of the results of the search, the power of a particular term in a query may also be determined. By manipulating each term in a query, increases or decreases in the quality of the results can be identified.

In an embodiment, the result of a given query "q" produces a set of all reviewed documents D(q), which includes a set of all relevant documents R(q) and a set of all non-relevant documents N(q). The quality, or "goodness", of a query may be quantified by how well the query returns the most relevant documents, while also minimizing the most irrelevant documents. The quality of a query may be determined based on how the query performs on the training set of documents, as detailed above. An increase in the "goodness" or quality of the query "q" may imply that the set of all relevant documents R(q) is larger and/or the set of non-relevant documents N(q) is smaller. Changes in the goodness or quality of a query may be evaluated mathematically by statistical modeling techniques such as the mutual information gain from the query. Additionally, other known performance measures such as the precision of a query, recall of a query, or the $F_1$ measure of a query, may be used to determine the "goodness" of a particular query.

Figure 5:
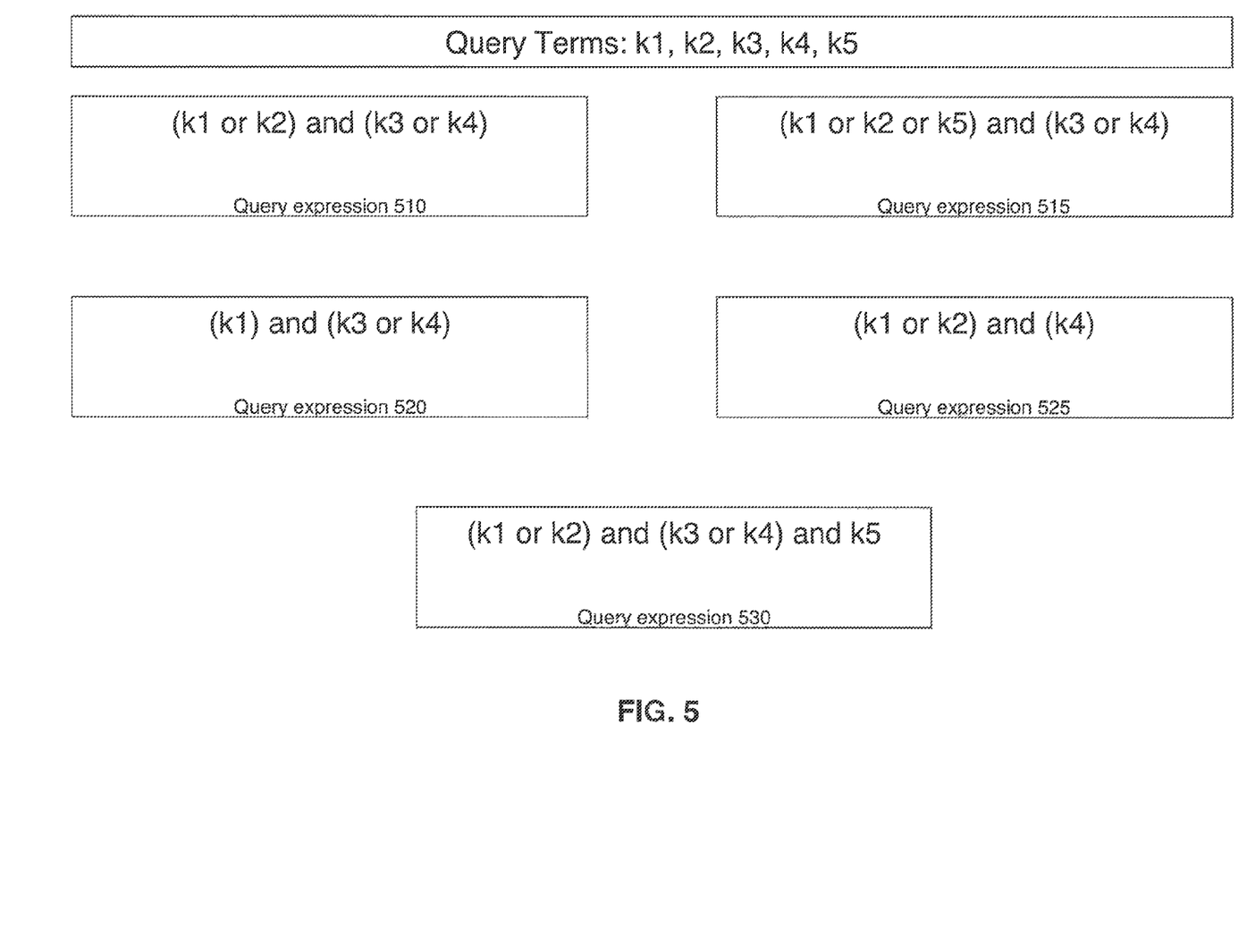
FIG. 5 is an example of various manipulations of queries and query terms in accordance with embodiments.

Queries may generally include conjunctions and disjunctions of keywords. In an embodiment, the manipulation of a query expression may be performed by growing or shrinking individual query terms or elements, or by adding and/or removing one or more terms or elements. Queries generated as a result of growing or shrinking an initial query are known as neighboring queries. FIG. 5 is an example of various manipulations of query terms in accordance with embodiments. In the example of FIG. 5, k1, k2, k3, k4, and k5 represent individual keywords or other complex query terms. Query expression 510 is an example of a query expression having a conjunction of a first disjunctive term (k1 or k2) and a second disjunctive term (k3 or k4). A query expression manipulated in this embodiment can also be a disjunction of conjunctions.

Figure 7:
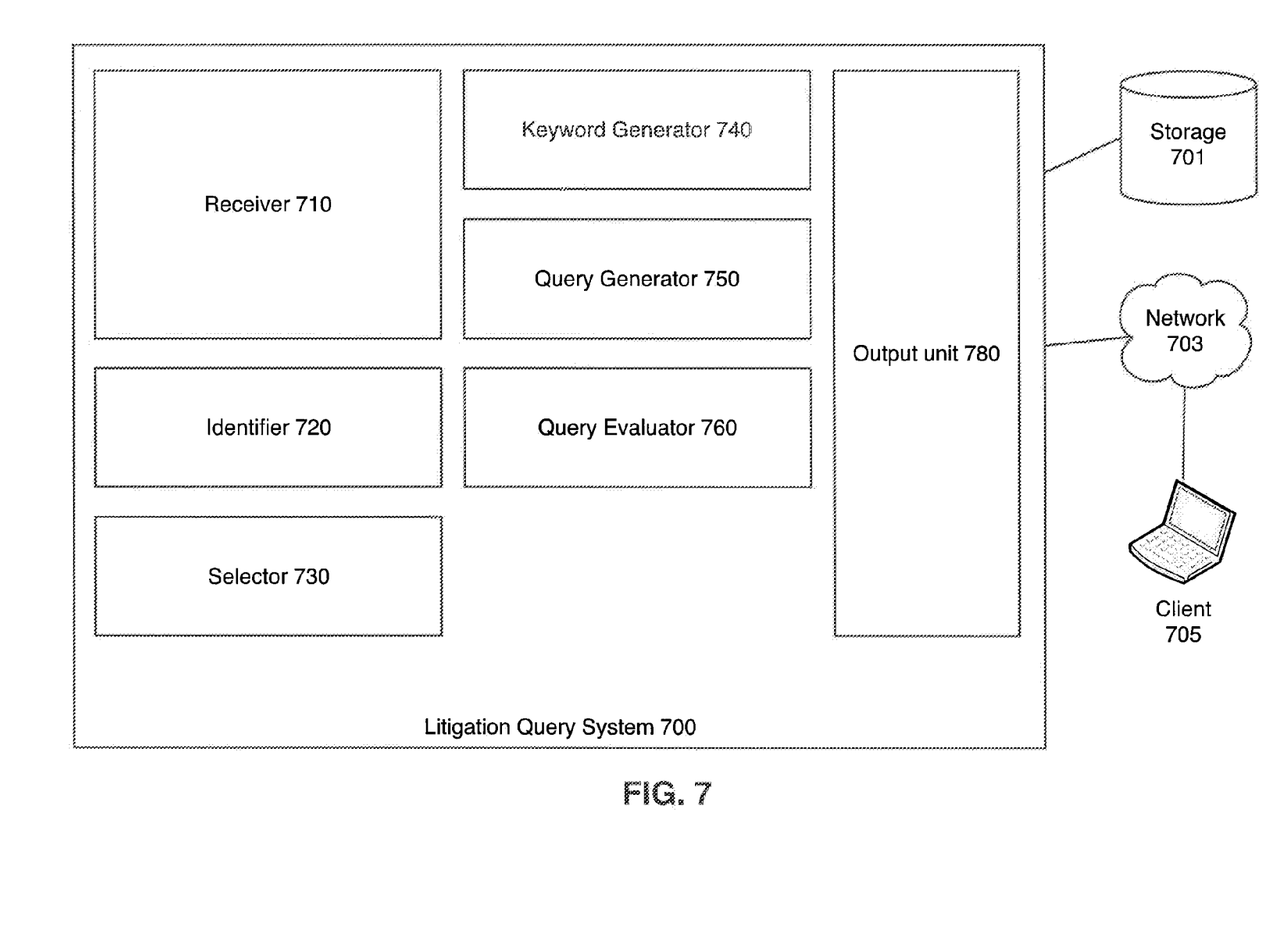
FIG. 7 is a diagram of a system in accordance with an embodiment.

Query expression 515 of FIG. 7 illustrates how a disjunctive term in a query may be grown. In query expression 515, an additional keyword k5 is added to the first disjunctive term (k1 or k2), such that the first disjunctive term reads (k1 or k2 or k5). The addition of keyword k5 may increase the breadth of the search query.

Queries may also be narrowed by effectively shrinking disjunctive terms. As shown in expression 520, query expression 510 is shrunk by removing term k2 from the first disjunctive term. Similarly, query expression 525 shrinks query expression 510 by removing the second query term k3.

Queries may also be grown by adding new conjunctive terms or elements. Query expression 530 displays an example of growing query expression 510 by adding conjunctive term k5. Query expression 530 will result in a narrower search than expression 510 because all three terms in the conjunction must be satisfied in order to find a matching document. Other manipulations may include using the AND NOT operator, to exclude terms found in non-relevant documents, or any other combination of boolean operators. Query expressions 515, 520, 525, and 530, shown in FIG. 5 may be known as neighboring queries to query 510.

Figure 6:
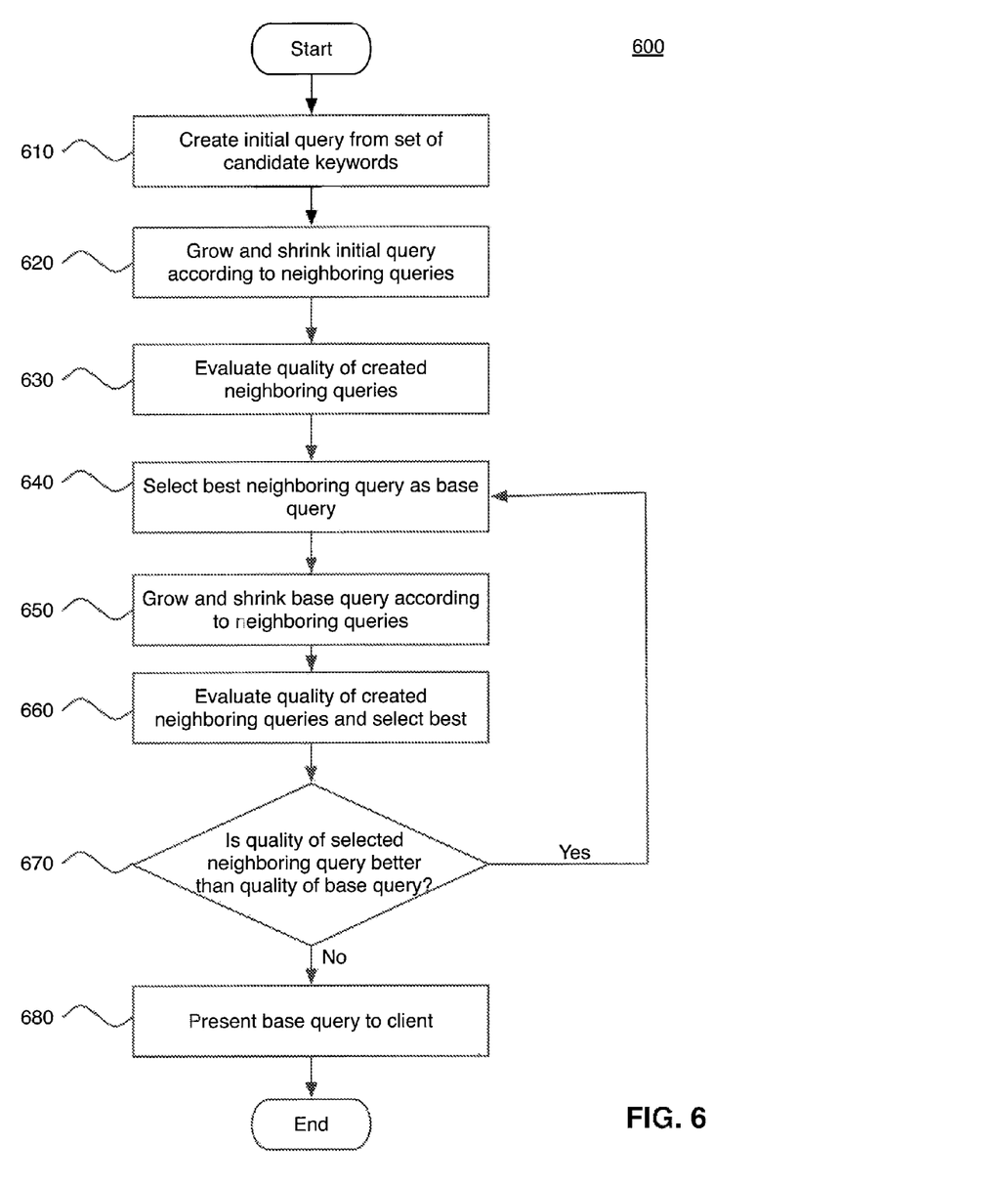
FIG. 6 is a flow diagram of a method for suggesting a query to a user, in accordance with an embodiment.

In an embodiment, the manipulations described above may be applied iteratively, with the results being evaluated upon each iteration, to identify queries with the best quality or "goodness" of results. FIG. 6 is a flow diagram of a method 600 of creating a query in accordance with an embodiment.

At block 610, an initial query is created by selecting, from a set of candidate keywords, a single keyword or set of keywords that can be used to start building a search query. The single keyword may be, for example, the most discriminating keyword, the most common or most rare keyword, a random keyword or a keyword selected by a searcher or other member of a legal team.

At block 620, the initial query may be grown and shrank according to neighboring queries, as detailed above. For example, at block 620, the initial query may be grown to add an additional disjunctive term and/or an additional conjunctive term. Terms added to the initial query may be, for example, other selected keywords known to have a high discriminatory power, random keywords, or keywords suggested by a searcher or member of a legal team. At block 620, one or more neighboring queries of the initial query are generated.

At block 630, the neighboring queries generated at block 620 are evaluated to determine each query's quality or "goodness". The quality may be evaluated by any of the above detailed methods, or by any other quality measure known to those skilled in the art. For example, each query's quality may be measured on how well the query returns the set of relevant documents in the training set. Based on the quality of each neighboring query generated, the best query with the maximum quality may be selected at block 840 for further modification.

At block 650, one or more neighboring queries based on the query selected at block 640 are generated. Similar to block 620, the query is grown or shrunk according to various combinations of conjunctive and disjunctive terms. At block 660, the quality of each neighboring query generated at block 650 is evaluated.

At block 660, the best quality query generated at block 650 is selected. The quality of this query is compared to the quality of the base query generated and selected at block 640. If the quality of the query generated at block 650 is greater than the quality of the base query selected at block 640, the method returns to block 640, and new neighboring queries are generated from the best query generated at block 650.

If the quality of the best neighboring query generated at block 650 is less than the quality of the base query selected at block 640, the base query of block 640 is presented to a client or user. In this way, the initial query used at block 610 is iteratively improved until the best query is generated and presented to a user. This query may then be used on the larger set of documents to return a set similar in characteristics to the training set of documents.

In an embodiment, as a training set of documents grows, iterations of method 600 of FIG. 6 may be repeated with a larger training set of documents. As more documents are added, further queries may be generated and presented to a client.

FIG. 7 is a diagram of an exemplary litigation query system 900 that may be used to implement various embodiments disclosed herein.

Litigation query system 700 includes a receiver 710. Receiver 710 may be configured to receive data such as seed keywords or initial queries. Additionally, receiver 710 may be configured to receive data such as a training set of documents, as described with respect to various embodiments disclosed herein.

Litigation query system 700 also includes an identifier 720 and selector 730. Identifier 720 may be used in accordance with various embodiments disclosed herein to identify documents corresponding to a query or keywords. Selector 730 may be configured in accordance with various embodiments disclosed herein to select documents, a query, or a keyword.

Litigation query system 700 may also include keyword generator 740. Keyword generator 740 may operate in accordance with various blocks of method 300 to generate suggested keywords, based on training documents or other data provided by other components of litigation hold system 700.

Litigation query system 700 may include query generator 750. Query generator 750 may be configured to generate neighboring queries from a base query, in accordance with embodiments. For example, query generator 750 may be configured to generate queries in accordance with blocks 620 and 650 of method 600.

Litigation query system 700 may also include query evaluator 760. Query evaluator 760 may be configured to evaluate the results of one or more queries generated by query generator 750. Selector 730 may operate in conjunction with data provided by query evaluator 760 to select a query in accordance with block 660 of method 600.

Litigation query system 700 may also include output unit 780. Output unit 780 may be configured to display or otherwise notify a user, client, or other party of the suggested keywords, queries, or results generated by keyword generator 740 or query generator 750.

In an embodiment, litigation query system 700 is connected to network 703. Network 703 may be a local area network (LAN), wide area network (WAN), intranet, internet, WI-FI, cell phone network, or any other wired or wireless network for communication between computing devices. In an embodiment, litigation query system is connected to client 705 via network 703.

In an embodiment, litigation query system 700 may be connected to storage 701, directly or indirectly via network 703. Storage 701 may contain a training set of documents, a set of documents to be placed on litigation hold, or any other data necessary for the operation of litigation query system 700.

Figure 8:
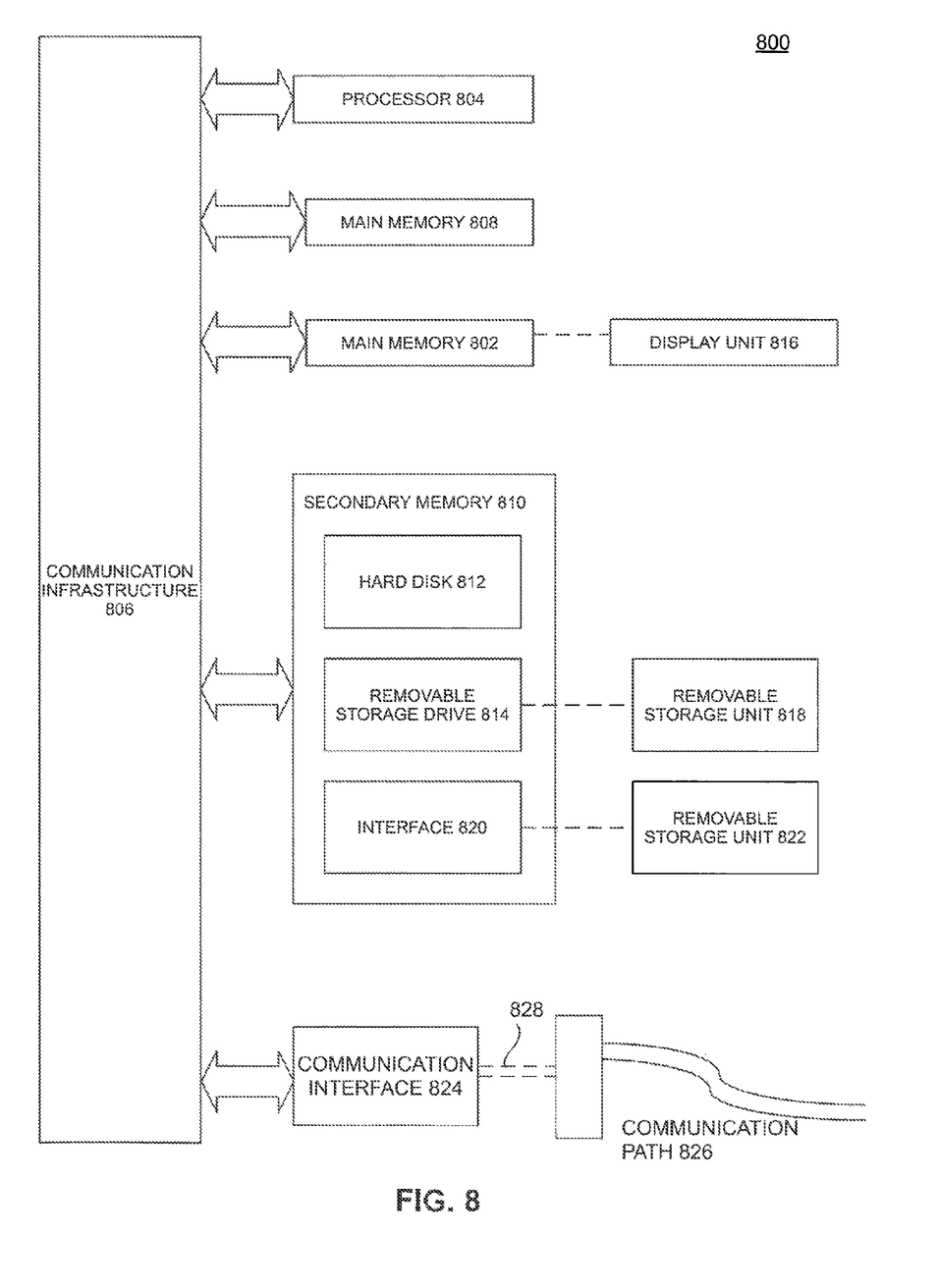
FIG. 8 is a diagram of an exemplary computer system used to implement various embodiments.

Various aspects of embodiments described herein can be implemented by software, firmware, hardware, or a combination thereof. FIG. 8 illustrates an example computer system 800 in which the embodiments, or portions thereof, can be implemented as computer-readable code. Various embodiments are described in terms of this example computer system 800.

Computer system 800 includes one or more processors, such as processor 804. Processor 804 can be a special purpose or a general purpose processor. Processor 804 is connected to a communication infrastructure 806 (for example, a bus or network).

Computer system 800 also includes a main memory 808, such as random access memory (RAM), and may also include a secondary memory 810. Secondary memory 810 may include, for example, a hard disk drive and/or a removable storage drive. Removable storage drive 814 may include a floppy disk drive, a magnetic tape drive, an optical disk drive, a flash memory, or the like. The removable storage drive 814 reads from and/or writes to removable storage unit 818 in a well known manner. Removable storage unit 818 may include a floppy disk, magnetic tape, optical disk, etc. which is read by and written to by removable storage drive 814. As will be appreciated by persons skilled in the relevant art(s), removable storage unit 818 includes a computer readable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 are in the form of signals which may be electronic, electromagnetic, optical, or other signals capable of being received by communications interface 824. These signals are provided to communications interface 824 via a communications path 826. Communications path 826 carries signals and may be implemented using wire or cable, fiber optics, a phone line, a cellular phone link, an RF link or other communications channels.

In this document, the terms "computer program product" and "computer readable medium" are used to generally refer to storage media such as removable storage unit 818, removable storage unit 822, and a hard disk installed in hard disk drive 812. Computer program product and computer readable medium can also refer to one or more memories, such as main memory 808 and secondary memory 810, which can be memory semiconductors (e.g. DRAMs, etc.). These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the embodiments as discussed herein. In particular, the computer programs, when executed, enable processor 804 to implement the processes of embodiments, such as the steps in the methods discussed above. Accordingly, such computer programs represent controllers of the computer system 800. Where embodiments are implemented using software, the software may be stored in a computer program product and loaded into computer system 800 using removable storage drive 814, interface 820, or hard drive 812.

Embodiments may also be directed to computer products having software stored on any computer readable medium. Such software, when executed in one or more data processing devices, causes a data processing device(s) to operate as described herein.

CONCLUSION

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method of suggesting a query for identifying documents in a litigation hold, comprising:
    receiving a training set of documents, wherein each document in the training set of documents is given a relevance indicator;
    identifying, by one or more processing devices, properties shared among documents having a similar relevance indicator, and an initial query with one or more initial keywords;
    determining a spatial proximity between one of the initial keywords and a set of keywords in the training set of documents;
    generating one or more neighboring queries from the initial query based on the spatial proximity, the neighboring queries including one or more additional queries;
    receiving a quality score of the neighboring queries, including an indication of a highest ranked neighboring query;
    repeating the generating one or more neighboring queries and receiving a quality score of the neighboring queries, wherein the highest ranked neighboring query is provided as the initial query, until an indication is received that a quality score of the highest ranked neighboring query is less than a quality score of the initial query, wherein a previously highest ranked neighboring query with a quality score greater than or equal to the quality score of the initial query is a resultant query; and
    generating a suggested litigation hold query based on the resultant query, wherein the suggested litigation hold query returns documents subject to the litigation hold.

2. The method of claim 1, wherein the relevance indicator is given to the documents prior to the receiving.

3. The method of claim 1, wherein the relevance indicator is given to the documents based on the result of a query.

4. The method of claim 1, wherein the properties shared between documents are keywords common to each of the documents.

5. The method of claim 4, wherein the suggested litigation hold query generated is based on a previous query and adding new keywords found in relevant documents.

6. The method of claim 4, wherein the suggested litigation hold query generated is based on a previous query and adding new keywords found in non-relevant documents.

7. The method of claim 1, wherein the properties shared between documents are relationships between keywords found in the documents.

8. The method of claim 1, further comprising:
    adding one or more additional documents to the training set of documents, wherein each additional document is given a relevance indicator;
    identifying, by one or more processing devices, properties shared among documents having a similar relevance indicator; and
    generating a second suggested litigation hold query based on the identified properties, wherein the second suggested litigation hold query returns documents subject to the litigation hold.

9. The method of claim 1, wherein the generating one or more neighboring queries from the initial query comprises:
    determining a discriminatory power indicating a degree of relevance for a set a keywords between each keyword of the set and the training set of documents; and
    selecting one or more additional keywords from the set of keywords based on a higher discriminatory power for use with one of the neighboring queries.

10. The method of claim 1, wherein the generating, one or more neighboring queries from the initial query comprises:
    selecting one or more additional keywords based on a random walk algorithm for use with one of the neighboring queries.

11. The method of claim 1, wherein the generating one or more neighboring queries from the initial query comprises:
    generating a neighboring query including a varying Boolean combination of the one or more initial keywords.

12. The method of claim 1, wherein the generating comprises:
    generating the set of one or more neighboring queries based on both growing and shrinking the initial query.

13. A method of generating a query for identifying documents subject to a litigation hold, comprising:
    receiving a training set of documents, wherein each document in the set of training documents is given a relevance indicator;
    receiving an initial query with one or more initial keywords;
    querying the training set of documents based on the initial query;
    determining a spatial proximity between one of the initial keywords and a set of keywords in the training set of documents;
    generating, by one or more processing devices, a set of one or more neighboring queries query based on the spatial proximity, the neighboring queries including one or more additional queries;
    evaluating each of the one or more neighboring queries in the set by assigning a quality score;
    determining a highest ranked neighboring query based on a comparison of the quality scores;

repeating the generating a set of one or more neighboring queries, evaluating each of the one or more neighboring queries, and determining a highest ranked neighboring query, wherein the highest ranked neighboring query is provided as the initial query, until it is determined that a quality score of the highest ranked neighboring query is less than a quality score of the initial query, wherein a previously highest ranked neighboring query with a quality score greater than or equal to the quality score of the initial query is a resultant query; and presenting the resultant query to a user.

14. The method of claim 13, wherein the neighboring queries are evaluated based on one or more of the precision of the query, recall of the query, or the $F_1$ score of the query.

15. The method of claim 13, further comprising:

generating, by one or more processing devices, a second set of neighboring queries based on the selected neighboring query;

evaluating each of the one or more neighboring queries in the second set by assigning a quality score;

selecting a neighboring query from the second set based on the quality score of the query; and presenting the neighboring query to a user.

16. A system for suggesting a query for identifying documents in a litigation hold, comprising:

a first receiver that receives a set of training documents, wherein each document in the training set is given a relevance indicator;

an identifier that identifies properties shared between documents having a similar relevance indicator, and an initial query with one or more initial keywords; and a query generator implemented on one or more processing devices that when executed by the one or more processing devices:

determines a spatial proximity between one of the initial keywords and a set of keywords in the training set of documents;

generates one or more neighboring queries from the initial query based on the spatial proximity, the neighboring queries including one or more additional queries, receives a quality score of the neighboring queries, including an indication of a highest ranked neighboring query, repeats the generating one or more neighboring queries and receiving a quality score of the neighboring queries, wherein the highest ranked neighboring query is provided as the initial query, until an indication is received that a quality score of the highest ranked neighboring query is less than a quality score of the initial query, wherein a previously highest ranked neighboring query with a quality greater than or equal to the quality of the initial query is a resultant query, and generates a suggested litigation hold query based on the resultant query, wherein the suggested litigation hold query returns documents subject to the litigation hold.

17. A system for suggesting a query for identifying documents subject to a litigation hold, comprising:

a first receiver that receives a training set of documents, wherein each document in the set of training documents is given a relevance indicator;

a second receiver that receives an initial query with one or more initial keywords;

a query generator that:

determines a spatial proximity between one of the initial keywords and a set of keywords in the training set of documents, and generates one or more neighboring queries from the initial query based on the spatial proximity, the neighboring queries including one or more additional queries;

a query evaluator that evaluates each neighboring query in the set and assigns a quality score to each query, and determines a highest ranked neighboring query;

a selector unit that selects the highest ranked neighboring query in the set based on the quality score of the query wherein the highest ranked neighboring query is provided as the initial query to the query generator until an indication is received that a quality score of the highest ranked neighboring query is less than a quality score of the initial query, wherein a previously highest ranked neighboring query with a quality score greater than or equal to the quality score of the initial query is a resultant query; and an output unit that presents the resultant query to a user.

18. A non-transitory computer readable medium containing instructions which, when executed by one or more processing devices, perform a method of generating a query for identifying documents subject to a litigation hold, the method comprising:

receiving a training set of documents, wherein each document in the set of training documents is given a relevance indicator;

receiving an initial query including one or more initial keywords;

querying the training set of documents based on the initial query;

determining a spatial proximity between one of the initial keywords and a set of keywords in the training set of documents;

generating, by one or more processing devices, a set of one or more neighboring queries based on the spatial proximity, the neighboring queries including one or more additional keywords;

evaluating each of the one or more neighboring queries in the set by assigning a quality score, including determining a highest ranked neighboring query;

repeating the generating a set of one or more neighboring queries and evaluating each of the one or more neighboring queries, wherein the highest ranked neighboring query is provided as the initial query, until it is determined that a quality score of the highest ranked neighboring query is less than a quality score of the initial query, wherein a previously highest ranked neighboring query with a quality score greater than or equal to the quality of the initial query is a resultant query; and presenting the resultant query to a user.

19. The computer readable medium of claim 18, wherein the neighboring queries are evaluated based on one or more of the precision of the query, recall of the query, or the $F_1$ score of the query.

* * * * *